Figure 1:
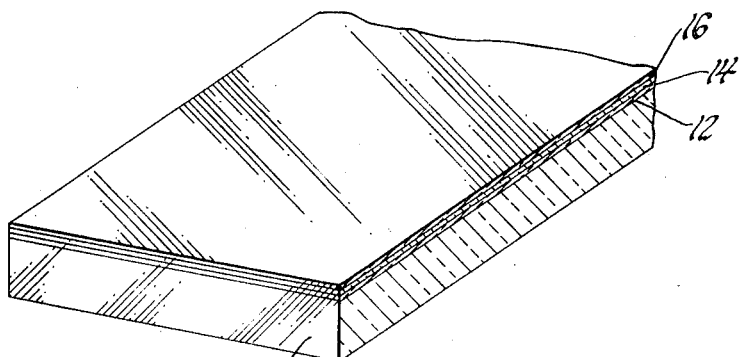

United States Patent

White et al.

[15] 3,652,379

[45] Mar. 28, 1972

[54] LAMINATED TRANSPARENT ABRASION RESISTANT ARTICLE

[72] Inventors: Ronald E. White, Romeo; Zachariah G. Gardlund, Utica, both of Mich.

[73] Assignee: General Motors Corporation, Detroit, Mich.

[22] Filed: Nov. 7, 1969

[21] Appl. No.: 874,771

[52] U.S. Cl. ..................161/183, 117/72, 117/138.8 PV, 117/138.8 R, 161/188, 161/206, 161/404, 351/166
[51] Int. Cl. .................................B32b 17/10, C03c 27/12
[58] Field of Search..................161/164, 183, 188, 206, 404; 117/72, 138.8 R, 138.8 PV; 351/166

[56] References Cited

UNITED STATES PATENTS

| | | | |
|---|---|---|---|
| 3,526,572 | 9/1970 | Finelli | 161/183 |
| 3,532,590 | 10/1970 | Priddle | 161/183 |
| 3,539,442 | 11/1970 | Buckley et al. | 161/183 |
| 3,549,476 | 12/1970 | Dietzel et al. | 161/183 |
| 3,360,498 | 12/1967 | Rawlings | 161/183 X |
| 3,388,035 | 6/1968 | Mattimoe | 161/183 |
| 3,406,086 | 10/1968 | Foster | 161/183 |
| 3,441,399 | 4/1969 | Levene et al. | 117/72 X |
| 3,484,157 | 12/1969 | Crandon et al. | 351/166 |

*Primary Examiner*—Harold Ansher
*Attorney*—William S. Pettigrew and George A. Grove

[57] ABSTRACT

A transparent polycarbonate resin article, such as an automobile windshield, is prepared having a three-layer, scratch resistant film (about 1 mil in thickness) on a surface thereof. The film contains three layers as formed; an inner layer of a suitable hydroxylated polycarbonate resin, an intermediate layer of silica and poly(vinyl butyral), and an outer layer of silica and poly(vinyl alcohol). The three layers are formed sequentially by wetting a surface of the polycarbonate body with a solution of the specific material in the first layer, evaporating the solvent to form a thin residual solid coating, and repeating this process with respect to the materials specified for the other two layers until the three-layer film is completed.

5 Claims, 3 Drawing Figures

PATENTED MAR 28 1972 3,652,379

INVENTORS
Ronald E. White &
BY Zachariah G. Gardlund

George A. Grove
ATTORNEY

LAMINATED TRANSPARENT ABRASION RESISTANT ARTICLE

This invention relates to scratch resistant polycarbonate articles particularly suitable for optical devices, such as windows or windshields. More particularly, this invention relates to a thin surface coating film which is transparent, tightly adherent to polycarbonate resins, tough, durable and abrasion resistant.

The optical clarity and toughness of polycarbonate resins is well recognized. There is interest in taking advantage of these properties to use polycarbonates as windows, windshields or the like. However, these advantageous properties of polycarbonate are somewhat compromised by their softness and their susceptibility to scratching which mars the optical surface.

It is an object of our invention to provide a clear, abrasion resistant coating film containing both organic and inorganic materials on a transparent polycarbonate resin body.

It is a more specific object of our invention to provide a windshield or window formed principally of a transparent sheet of polycarbonate resin having at least one surface coated with a thin, adherent, three-layer composite film which is clear, resistant to scratching, and is not brittle as is window glass.

It is another object of our invention to provide a method of providing a clear, abrasion resistant film containing both organic and inorganic materials on the surface of a polycarbonate resin article, such as a window or windshield.

In accordance with a preferred embodiment of our invention these and other objects are accomplished by first providing a clear polycarbonate resin member in the form of a desired optical member, such as a window. At least one surface of the polycarbonate resin body is provided with a clear, relatively thin coating film which is initially formed in three layers. The inner layer consists essentially of a polycarbonate resin of the type containing a plurality of pendent hydroxyl groups distributed along the molecular chain of each individual polycarbonate molecule. This hydroxylated polycarbonate resin is dissolved in a solvent and simply applied by any convenient suitable means to the surface of the polycarbonate body. Upon evaporation of the solvent a thin residual layer of hydroxylated polycarbonate resin is formed which is both tightly adherent to the polycarbonate body and also capable of providing a bond with the next layer to be formed.

A solution of hydrolyzed ethyl ortho-silicate and poly(vinyl butyral) is then provided and a small amount of the solution is employed to wet the hydrolyzed polycarbonate layer. Upon evaporation of the solvent a second film layer consisting essentially of dried hydrolyzed ortho-silicate (probably largely silica) and poly(vinyl butyral) is formed.

Finally, a solution of hydrolyzed ethyl ortho-silicate and hydrolyzed poly(vinyl acetate), largely poly(vinyl alcohol), is prepared and a suitable amount used to wet the above-formed second coating layer on the polycarbonate body surface. Upon evaporation of the solvent a third film layer is thus formed which consists essentially of dried hydrolyzed ethyl ortho-silicate and poly(vinyl alcohol). The overall thickness of the film formed by these three coating steps is generally no greater than about one mil. However, this composite laminated coating is clear, extremely tough and durable, and resistant to scratching by steel wool.

In the case of a window or windshield it is contemplated that at least one surface of a polycarbonate sheet will be provided with a coating film as outlined above. In some cases both surfaces could be so coated. However, it is also contemplated that one surface would be coated by our film and the other surface would be provided with a glass coating sheet of suitable thickness bonded to the polycarbonate resin surface by an intermediate film of plasticized poly(vinyl butyral).

Figure 2:
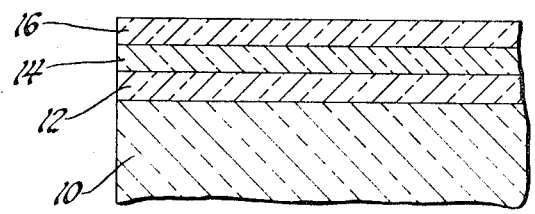
Figure 3:
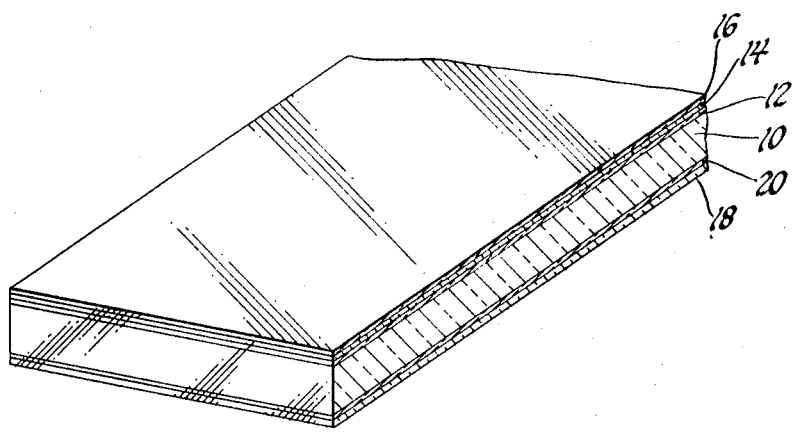

In accordance with our invention, these and other objects and advantages will be better understood in view of a detailed description of our coating and the method of its application. Reference will be made to the drawing, in which:

FIG. 1 is a perspective view of a portion of a polycarbonate window with our three-layer coating film thereon, the thickness of the three layers being exaggerated for purposes of illustration;

FIG. 2 is an enlarged section of a portion of the composite sheet illustrated in FIG. 1, the coating layers being further enlarged for purposes of illustration; and FIG. 3 is a perspective view, partly in section, of a portion of a composite of polycarbonate window, one surface of which is provided with our three-layer coating and the other surface is provided with a coating of glass bonded to the polycarbonate through an intermediate layer of poly(vinyl butyral).

Polycarbonate resins are polymeric combinations of bisphenols (bifunctional phenols) linked together through carbonate linkages. In a common method of their manufacture a dihydroxy aromatic compound is reacted with phosgene whereupon hydrogen chloride is typically eliminated and a high molecular weight polymer is formed. Many common polycarbonates are formed by reacting bisphenols with phosgene. The resulting plastics may be manufactured so that they are clear and transparent and have excellent toughness and high rigidity. However, these resins are soft and can be scratched. Scratches mar an optical surface by interfering with the transmittance of light through the optical element. In accordance with our invention we provide polycarbonate resins with a three-layer scratch resistant coating film which permits a designer to take advantage of the desirable properties of polycarbonate resins for optical purposes and substantially overcome their tendency to be scratched in normal usage.

A specific example will illustrate the practice of our invention. Optically clear commercial polycarbonate plastic is selected for processing. In general, its size and configuration will be predetermined by the corresponding characteristics of the optical element to be produced. The base layer of our three-layer coating is applied to a surface of the clear polycarbonate by spraying, dipping, brushing or other like suitable means, a solution which contains dissolved hydroxylated polycarbonate. Hydroxylated polycarbonates and a method of their preparation are described in our U.S. Pat. No. 3,567,686, issued Mar. 2, 1971, which is assigned to the assignee of the subject invention. In general, hydroxylated polycarbonates are derivatives of the above-identified polycarbonate resins except that they are characterized by the presence of a plurality of pendent hydroxyl groups along the molecular chains, there being in general about one hydroxyl group per repeating monomeric unit. Suitable hydroxylated polycarbonates for use in our invention have an average molecular weight in the range of about 6,000 to 10,000. They are further characterized nominally by the following structural formula:

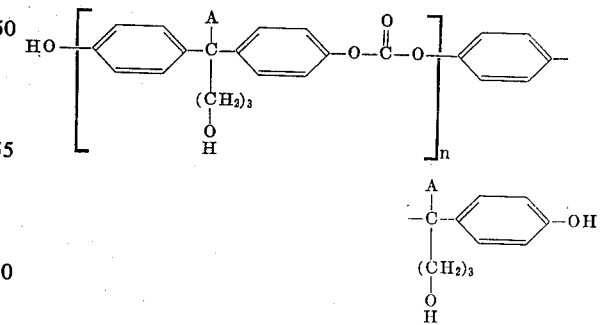

where A is a radical selected from the group consisting of — H, —$CH_3$, and —$C_6H_5$, and $n$ is an integer having values of about 20 to 35.

The hydroxylated polycarbonate polymer is dissolved in a suitable solvent, such as pyridine or sym-tetrachloroethane in concentrations ranging from about 1 to 5 percent by weight, and preferably 2 to 3 percent. The piece to be coated is easily dipped for example, into a solution of the hydrolyzed polycarbonate and slowly withdrawn at a rate of about 1 inch per minute to 6 inches per minute. The coated piece is then dried for about 1 to 6 hours at 120° C. The dried product is a clear, flaw-free piece of polycarbonate resin having a low concentration of hydroxyl groups on at least one surface which provides sites for the following two layers yet to be applied.

The second layer of our three-layer film coating consists of hydrolyzed ethyl ortho-silicate and poly(vinyl butyral). A solution or suspension of these ingredients is prepared and employed to wet the previously coated surface of the polycarbonate resin body by any suitable means. The solvent is then evaporated to leave a residual thin layer of dried hydrolyzed ethyl ortho-silicate and poly(vinyl butyral). A coating solution is preferably prepared, for example, in two steps in the following manner. A first solution is prepared by mixing by weight 100 parts ethyl ortho-silicate, 70 parts absolute ethyl alcohol and 22 parts of a 0.1 N solution of hydrochloric acid at room temperature. On mixing there is an immediate exothermic reaction which raises the temperature of the mixture about 30° C. The temperature increase is presumably caused by the hydrolysis of ethyl ortho-silicate to generate ethyl alcohol and an inorganic polymeric gel, commonly called silicic acid. To 25 parts of this reaction mixture solution is added 25 parts ethyl alcohol, 25 parts glacial acetic acid and 6 parts poly(vinyl butyral). The polycarbonate member that was previously treated with the hydroxyl polycarbonate is now dipped, for example, into the hydrolyzed ethyl silicate—poly(vinyl butyral) solution and slowly and steadily withdrawn therefrom at a constant speed of about 1 inch per minute to 6 inches per minute. The coated part is then baked at 120° C. for 10 to 60 minutes, preferably 20 minutes. In this way a second film layer was provided on top of the initially formed hydroxylated polycarbonate layer, the second layer consisting essentially of a mixture of dried hydrolyzed ethyl ortho-silicate and poly(vinyl butyral). Under these conditions the dried hydrolyzed ethyl ortho-silicate is probably silica. Assuming silica is formed, the second coating layer prepared as described contains about 2 parts of polymer per part of silica. In general, the dried second layer suitably contains approximately 1 part of silica and 1 to 4 parts poly(vinyl butyral) by weight. These proportions are easily controlled by adjusting the amounts of ethyl ortho-silicate and poly(vinyl butyral) employed in making up the coating mixture.

The top or outer layer of the three-layer film coat consists essentially of dried hydrolyzed ethyl ortho-silicate and hydrolyzed poly(vinyl acetate). This coating is preferably formed by initially providing a solution or suspension of these ingredients and employing the mixture to wet the previously coated surface of the polycarbonate resin body by any suitable means. The solvent is evaporated to leave a thin, residual layer of silica and hydrolyzed poly(vinyl acetate). In this instance, hydrolyzed ethyl ortho-silicate is prepared by first mixing by weight 41 parts ethyl ortho-silicate with 8 parts of 5% of hydrochloric acid and shaking the contents in a closed bottle for 5 minutes to provide vigorous agitation. The resulting homogenous solution is then placed in an oven at 60° C. for 1 hour. The reaction product is hydrolyzed ethyl ortho-silicate like that produced with respect to the second coating layer except that a more viscous mixture is formed in this instance.

To 25 parts by weight of this hydrolyzed ethyl ortho-silicate solution is added 25 parts by weight glacial acetic acid and 25 parts by weight of a solution made by dissolving by weight 20 parts of a partially hydrolyzed poly(vinyl acetate) in 100 parts absolute ethanol and 60 parts water. The poly(vinyl acetate) is 70 to 99 percent hydrolyzed, preferably 85 to 95 percent hydrolyzed, to poly(vinyl alcohol). Thus, the resulting solution for coating contains hydrolyzed ethyl ortho-silicate and poly(vinyl alcohol). The previously treated polycarbonate resin body having two coating layers on a surface thereof is then dipped into the final solution and withdrawn at a rate of about 1 inch to 6 inches per minute and baked at 120° C. for 20 minutes. In the above exemplary preparation of the third coating solution the quantities of the respective ingredients were controlled so that the dried coating would contain about 1 part poly(vinyl alcohol) and 2.2 parts silica. In general, the proportions of these ingredients in the topcoat can range from 1 part polymer and 1 to 2.5 parts silica. It is feasible that during the above drying step the silica and poly(vinyl alcohol) chemically react to form a crosslinked mixture.

Thus, as illustrated in FIG. 1 and 2 of the drawing and in accordance with our invention, a transparent polycarbonate window sheet 10 or other optical element is coated on at least one surface with an inner layer of hydroxylated polycarbonate 12, a second or intermediate layer 14 consisting essentially of dried hydrolyzed ethyl ortho-silicate (silica) and poly(vinyl butyral), and a third or outer layer 16 of dried hydrolyzed ethyl ortho-silicate (silica) and poly(vinyl alcohol). The combined thickness of the three layers is approximately one mil. As indicated, such a film coating can be applied to either one or both sides of a sheet of polycarbonate resins. In another embodiment of our invention as shown in FIG. 3, our three-layer coating is applied to one side only of the polycarbonate sheet and the other side is protected with a thin layer of glass 18 bonded to the polycarbonate sheet 10 with an intermediate layer of plasticized poly(vinyl butyral) 20. Once a polycarbonate sheet has been provided with our three-layer, abrasion resistant coating film, a glass sheet and intermediate poly(vinyl butyral) film, preferably about 0.03 inch thick, may be applied to the other side by placing the glass, poly(vinyl butyral) film, and coated polycarbonate sheet in a suitable press in proper sandwich relationship and subjecting the sandwich to a pressure of about 100 pounds per square inch at a temperature of about 100° C. After being squeezed in the press for about 1 hour the six-layer laminate is removed, cooled in a water bath and then dried. The resulting product is a tough, durable and abrasion resistant optical element which can be used in a variety of abrasive enviroments.

Thus, our three-layer coating provides a tough, tightly adherent, transparent, abrasion resistant surface for a conventional polycarbonate resin body member. Each of the three layers is required in the specified order to obtain these properties. The hydroxylated polycarbonate layer provides at least the strong bond between the base resin and the outer layers. The silica-organic polymer mixture in the outer layers cooperate to provide toughness and abrasion resistance. The three layers are optically clear and may be abraded with steel wool without showing scratches which would distort the transmittance of light.

While our invention has been described in terms of certain preferred embodiments it will be appreciated that other forms thereof could readily be adapted by one skilled in the art. Therefore, the scope of our invention is not limited to the specific embodiments illustrated.

What is claimed is:

1. A transparent, abrasion resistant article comprising a clear polycarbonate resin base layer, a first coating film layer of hydroxylated polycarbonate resin strongly adhering to a surface of said polycarbonate resin base layer, a second coating film layer superimposed on said first layer, said second film layer consisting essentially of silica and poly(vinyl butyral) and a third coating film layer superimposed on said second layer, said third film layer consisting essentially of silica and poly(vinyl alcohol).

2. A composite, transparent article comprising a tough, clear, polycarbonate resin base layer having formed on a surface thereof a three-layer abrasion resistant, transparent film, the innermost layer of said film adjacent said base layer consisting essentially of a polycarbonate resin containing a plurality of pendent hydroxyl groups along the molecular chains of the polycarbonate molecules, the middle layer of said film consisting essentially by weight of a mixture of one part dried, hydrolyzed ethyl ortho-silicate and about one to four parts poly(vinyl butyral) AND the outer layer of said film consisting essentially by weight of one part poly(vinyl alcohol) and one to two and one-half parts of dried, hydrolyzed ethyl ortho-silicate.

3. A transparent polycarbonate resin body having an abrasion resistant coating on a surface thereof, said coating being initially formed as three distinct thin film layers, the first said layer being strongly adherent to said resin body and consisting essentially of a hydroxylated polycarbonate resin characterized by the presence of a pendent hydroxyl group in a major portion of the repeating monomeric units of the polycarbonate molecules, said hydroxylated polycarbonate having a molecular weight of about 6,000 to 10,000, the second said layer being strongly adherent to said first layer and consisting essentially by weight of about one part silica and one to four parts poly(vinyl butyral) and the third said layer being strongly adherent to said second layer and consisting essentially by weight of about one part poly(vinyl alcohol) and one to two and one-half parts silica, the total thickness of said three layers being about 1 mil.

4. A polycarbonate window comprising a sheet of clear, tough polycarbonate resin and a transparent, abrasion resistant coating on at least one surface thereof, said coating being initially formed as three distinct thin layers, the first said layer being strongly adherent to said resin body and consisting essentially of a hydroxylated polycarbonate resin characterized by the presence of a pendent hydroxyl group in a major portion of the repeating monomeric units of the polycarbonate molecules, said hydroxylated polycarbonate having a molecular weight of about 6,000 to 10,000, the second said layer being superimposed on said first layer and consisting essentially by weight of one part silica and one to four parts poly(vinyl butyral) and the third said layer being superimposed on said second layer and consisting essentially by weight of about one part poly(vinyl alcohol) and one to two and one-half parts silica, the total thickness of said three-layer coating being about one mil.

5. A laminated window comprising an inner body sheet of tough, clear polycarbonate resin, said body sheet being provided with a transparent, abrasion resistant coating on both sides, the abrasion resistant coating on one side of said polycarbonate sheet comprising an intermediate film of poly(vinyl butyral) and an outer layer of glass sheet, the abrasion resistant coating on the other side of said polycarbonate body member being initially formed as three distinct thin layers, the first said layer being strongly adherent to said resin body and consisting essentially of a hydroxylated polycarbonate resin characterized by the presence of a pendent hydroxyl group in a major portion of the repeating monomeric units of the polycarbonate molecules, said hydroxylated polycarbonate having a molecular weight of about 6,000 to 10,000, the second said layer being strongly adherent to said first layer and consisting essentially by weight of one part silica and one to four parts poly(vinyl butyral) and the third said layer being strongly adherent to said second layer and consisting essentially by weight of about one part poly(vinyl alcohol) and one to two and one-half parts silica, the total thickness of said three-layer coating being about 1 mil.

* * * * *

PO-1050
(5/69)

UNITED STATES PATENT OFFICE
CERTIFICATE OF CORRECTION

Patent No. 3,652,379    Dated March 28, 1972

Inventor(s) Ronald E. White and Zachariah G. Gardlund

It is certified that error appears in the above-identified patent and that said Letters Patent are hereby corrected as shown below:

Column 1, line 45, "hydrolyzed" should be -- hydroxylated --; line 47, after "hydrolyzed" insert -- ethyl --. Column 2, line 44, "10.000" should be -- 10,000 --; line 64 after "of" delete the minus sign "-"; line 65, "H" should be -- -H --; line 71, "hydrolyzed" should be -- hydroxylated --. Column 3, line 49, after "5%" delete "of"; line 52, "homogenous" should be -- homogeneous --. Column 4, line 22, after "glass," insert -- the --.

Signed and sealed this 8th day of August 1972.

(SEAL)
Attest:

EDWARD M. FLETCHER, JR.
Attesting Officer

ROBERT GOTTSCHALK
Commissioner of Patents